(12) United States Patent
Diehl et al.

(10) Patent No.: US 9,297,405 B2
(45) Date of Patent: Mar. 29, 2016

(54) BOLT ELEMENT AND A METHOD FOR THE ATTACHMENT OF A BOLT ELEMENT TO A COMPONENT OF A COMPOSITE MATERIAL

(71) Applicant: PROFIL Verbindungstechnik GmbH & Co. KG, Friedrichsdorf (DE)

(72) Inventors: Oliver Diehl, Bad Homburg v.d.H. (DE); Richard Humpert, Bad Nauheim (DE); Andreas Lembach, Darmstadt (DE); Christian Sowa, Offenbach (DE)

(73) Assignee: PROFIL VERBINDUNGSTECHNIK GMBH & CO., KG, Friedrichsdorf (DE)

( * ) Notice: Subject to any disclaimer, the term of this patent is extended or adjusted under 35 U.S.C. 154(b) by 430 days.

(21) Appl. No.: 13/745,032

(22) Filed: Jan. 18, 2013

(65) Prior Publication Data

US 2013/0185917 A1    Jul. 25, 2013

(30) Foreign Application Priority Data

Jan. 20, 2012    (DE) .......................... 10 2012 001 086

(51) Int. Cl.
*B21D 39/00* (2006.01)
*B23P 11/00* (2006.01)
(Continued)

(52) U.S. Cl.
CPC .............. *F16B 39/282* (2013.01); *B23P 19/00* (2013.01); *B23P 19/064* (2013.01); *F16B 19/14* (2013.01);
(Continued)

(58) Field of Classification Search
CPC .... F16B 37/065; F16B 39/282; F16B 37/068; F16B 25/106; F16B 19/14; Y10T 29/49881; B23P 19/00; B23P 19/001; B23P 19/06; B23P 19/064; B21C 37/26; B25B 27/143

USPC ........ 29/456, 525.01, 525.08, 525.11, 525.13
See application file for complete search history.

(56) References Cited

U.S. PATENT DOCUMENTS 3,124,031 A * 3/1964 Knohl ............................ 411/418
3,578,762 A * 5/1971 Siebol et al. ............... 411/387.6
(Continued)

FOREIGN PATENT DOCUMENTS

CH             445 955 A       8/1966
DE          692 30 291 T2     6/2000
(Continued)

OTHER PUBLICATIONS

German Search Report dated Nov. 7, 2012 issued in German Patent Appln. No. 10 2012 001 086.9.
(Continued)

*Primary Examiner* — Moshe Wilensky
*Assistant Examiner* — Darrell C Ford
(74) *Attorney, Agent, or Firm* — Hershkovitz & Associates, PLLC; Abraham Hershovitz; Eugene C. Rzucidlo (57) ABSTRACT

A method for the attachment of a bolt element to a component is described. The bolt element has a head part having a contact surface and a shaft part extending away from the head part, the shaft part having a tip provided at its end remote from the head part, the tip merging into a thread cylinder, optionally via a cylindrical region. The bolt element is pressed with the tip to the fore against the component and the tip is pressed through the component until the side of the component adjacent the head part of the bolt element enters to contact the thread cylinder and the tip thereby generates a hole in the component. The bolt element is subsequently turned so that the thread of the thread cylinder forms an internal thread in the wall of the hole. A bolt element is also claimed.

14 Claims, 8 Drawing Sheets

(51) Int. Cl.
    *B23P 17/00*     (2006.01)
    *F16B 39/282*     (2006.01)
    *F16B 35/06*     (2006.01)
    *F16B 25/10*     (2006.01)
    *F16B 37/06*     (2006.01)
    *F16B 19/14*     (2006.01)
    *B23P 19/00*     (2006.01)
    *B23P 19/06*     (2006.01)

(52) U.S. Cl.
    CPC ............... *F16B 25/106* (2013.01); *F16B 35/06* (2013.01); *F16B 37/068* (2013.01); *B23P 19/001* (2013.01); *B23P 19/06* (2013.01); *Y10T 29/49881* (2015.01)

(56) References Cited

U.S. PATENT DOCUMENTS

| | | | |
|---|---|---|---|
| 5,234,301 A * | 8/1993 | Grossberndt et al. | 411/386 |
| 5,304,023 A * | 4/1994 | Toback et al. | 411/387.3 |
| 5,513,933 A | 5/1996 | Rom | |
| 5,797,175 A | 8/1998 | Schneider | |
| 6,125,524 A * | 10/2000 | Mueller | 29/520 |
| 7,377,734 B2 * | 5/2008 | Bechtel et al. | 411/386 |
| 7,815,406 B2 | 10/2010 | Babej et al. | |
| 2003/0108400 A1 * | 6/2003 | Ross | 411/180 |
| 2003/0210970 A1 | 11/2003 | Bechtel, Jr. et al. | |
| 2006/0137166 A1 * | 6/2006 | Babej et al. | 29/509 |
| 2008/0222873 A1 * | 9/2008 | Draht et al. | 29/432 |
| 2009/0028662 A1 * | 1/2009 | Babej | 411/180 |
| 2009/0311074 A1 * | 12/2009 | Friederich et al. | 411/387.4 |
| 2010/0183404 A1 * | 7/2010 | Draht et al. | 411/455 |
| 2011/0116894 A1 * | 5/2011 | Huang | 411/387.4 |
| 2011/0289752 A1 * | 12/2011 | Werthwein | 29/428 |
| 2012/0107070 A1 * | 5/2012 | Bongartz et al. | 411/378 |
| 2012/0189402 A1 * | 7/2012 | Babej | 411/166 |
| 2013/0022782 A1 * | 1/2013 | Babej | 428/131 |
| 2013/0047414 A1 * | 2/2013 | Werthwein | 29/525.12 |
| 2013/0207298 A1 | 8/2013 | Diehl et al. | |

FOREIGN PATENT DOCUMENTS

| | | |
|---|---|---|
| DE | 696 30 901 T2 | 9/2004 |
| DE | 10 2011 009 599 A1 | 10/2011 |
| DE | 10 2011 010 053 A1 | 11/2011 |
| EP | 0 688 966 A1 | 6/1995 |
| EP | 0 718 509 A1 | 6/1996 |
| EP | 2 019 214 A2 | 1/2009 |

OTHER PUBLICATIONS

English Translation of German Search Report.
English Abstract of DE 692 30 291 T2.
English Abstract of DE 696 30 901 T2.
English Abstract of EP 0 688 966 A1.
Extended European Search Report mailed on May 21, 2013 in corresponding European Application No. EP 13 15 1948.0.
English Abstract for DE 10 2011 009 599 A1.
English Abstract for EP 0 718 509 A1.
English Abstract for EP 2 019 214 A2.
English Abstract for DE 10 2011 010 053 A1.

* cited by examiner

BOLT ELEMENT AND A METHOD FOR THE ATTACHMENT OF A BOLT ELEMENT TO A COMPONENT OF A COMPOSITE MATERIAL

CROSS-REFERENCE TO RELATED APPLICATIONS

The present application claims priority under 35 U.S.C. §119 to German Patent Application No. 10 2012 001 086.9, filed on Jan. 20, 2012, the disclosure of which is expressly incorporated by reference herein in its entirety.

FIELD OF THE INVENTION

The present invention relates to a method for attaching a bolt element to a component consisting of a composite material such as a fiber reinforced plastic part or a fabric reinforced plastic part, with the bolt element having a head part and a shaft part extending away from the head part, with the shaft part being provided with a tip at its end remote from the head part and optionally merging via a cylindrical region into a thread cylinder.

BACKGROUND OF THE INVENTION

Composite materials are frequently used in most diverse areas and consist mainly of plastic with embedded fiber reinforcement The fiber reinforcement can for example take the form of tapes, fabrics, felts and mats. For example, coachwork parts of polyester resins reinforced with glass fibers and plastics such as epoxy resins reinforced with carbon fibers are frequently used in motor car construction and numerous further components such as consoles and cladding are likewise manufactured from such composite materials. When using carbon fibers as a reinforcement, fabrics of carbon fibers are frequently used because one can then obtain a reinforcement in all directions of the component.

The field of composite materials is however in no way restricted to glass fibers and carbon fibers there are many other reinforcement fibers which can be considered. Furthermore, the most diverse plastics can also be used as a matrix material. All such materials are described here generically as composite materials or fiber reinforced plastics. They can also be described by the generic term "organic sheet metals". This term is understood in some circles as a specialist term. The present invention primarily uses those composite materials which use a thermplastic material, i.e. a thermoplastic as matrix material which softens or becomes pasty at elevated temperatures below the melting point. It is however not precluded that duroplastics can also be used as a matrix material provided these are adequately soft or become soft or pasty at elevated temperature, i.e. at temperatures which lie beneath the temperatures at which the matrix material is permanently damaged. The invention can also be used for composite materials with matrix materials which are indeed not thermoplastics but have not yet reached their final state but rather are present in a state in which they soften with or without heating but which can be transferred into a harder state in the course of time or by the action of ultraviolet light or humidity or otherwise through progressive polymerization or cross-linking.

It is frequently necessary to use components of composite materials with fastener elements, for example in order to secure the corresponding components to other parts or to attach other parts to the fiber reinforced plastic components.

The attachment of bolt elements to components of composite materials makes it possible, for example, to secure the corresponding components to other parts or to secure other parts to the fiber reinforced plastic parts. A nut element at the further component can be used as a counterpiece to the respective bolt element.

It is usually necessary to provide a hole in the component of composite material through which the shaft part of the bolt element can be passed. Both threaded inserts or eyes can already be integrated into the plastic component during the manufacture of the component, which is however very time consuming and complicated and leads to further costs and sometimes makes a local thickening of the plastic part necessary. The manufacture of holes is mainly achieved by a drilling process, whereby material residues, such as cuttings, arise and the composite material is weakened in the region of the bore. It is conceivable to punch the component in order to generate the holes as required, whereby waste in the form of punching slugs which has to be dispensed of arises as well as a local weakening of the component.

Composite materials consist of any desired reinforcement material or fibers and any desired plastically deformable or meltable matrix material. The term "composite materials" as used here in accordance with the invention includes therefore not only plastics with fiber reinforcement but, for example, also matrix materials of metal, for example aluminum, with a reinforcing material, such as for example carbon fibers or ceramic particles.

SUMMARY OF THE INVENTION

The object of the present invention is to enable an at least substantially loss-free attachment of a bolt element to a component of composite material without pronounced weakening of the component.

This object is satisfied by a method in accordance with the invention which provides that the bolt element is pressed with the tip to the fore against the component and the tip is pressed through the component until the side of the component adjacent the head part of the bolt element enters to contact with the thread cylinder and the tip thereby generates a hole in the component and in that the bolt element is subsequently turned so that the thread of the thread cylinder forms an internal thread in the wall of the hole and that the contact surface is brought into engagement against the said side of the component.

Since the tip of the bolt element is driven through the component a hole arises for the shaft part of the bolt element. An unfavorable drilling or punching process can thus be avoided. Through the formation of the internal thread the bolt element is firmly seated in the component as a result. The invention makes use in particular of the recognition that many composite materials—optionally after corresponding heating—have an adequately soft or pasty consistency in order to easy pressing of a tip into the material. Insofar as the composite material of the component relates to reinforcing fibers, the elongate fibers are pushed to one side during the pressing of the tip to the component rather than being parted so that, in comparison to a drilling or punching process, only a small weakening of the material arises. A particular advantage of the invention consists also to the fact that both the hole for the passage of the shaft of the bolt and also the internal thread for the holding of the bolt element in the component are to a certain extent automatically produced during introduction of the bolt element, so that additional working steps can be spared.

In principle it is not out of the question that a pre-piercing could be effected. For example, such a pre-piercing could take place during a manufacture of the fiber reinforced components in a press or in a drilling process, for example when a type of pre-positioning or pre-centering of the fiber reinforced component relative to another component or vice versa is to be ensured by the pre-piercing.

The bolt element can have an axial ring groove radially within the ring-like contact surface which is arranged concentric to the shaft part, and which is optionally equipped with features providing security against rotation. Furthermore the component can have a ring-like raised portion at its side remote from the head part. In accordance with an embodiment of the invention the bolt element is rotated until the raised portion enters into engagement with the axial ring groove and optionally with the features providing security against rotation provided there. The axial ring groove extends preferably from a radially inner end of the contact surface or from a radial outer edge of the head part up to the shaft part. Raised portions which arise through the pressing of the tip through the component or raised portions which are intentionally provided at the component can be received in ring groove. In order to facilitate the reception process the ring groove can have a rounded cross-sectional shape. Radially extending ribs or grooves can in particular be considered as features providing security against rotation and are preferably uniformly arranged around the periphery of the shaft part. The features providing security against rotation bring about a fixed clawing of the head part of the bolt element into the components so that an undesired release of the screw connection formed by the engagement of the thread cylinder and the internal thread is prevented. Furthermore, the radially inner side of the ring groove can have a diameter which is smaller than the outer diameter of the thread cylinder, with the material of the components around the hole, in particular in the region of the raised portion being so deformed that it at least substantially fills out the ring groove or enters into an undercut formed between the thread cylinder and the head part. As a result of such an engagement of the head side end region of the shaft part by the material of the component the resistance against press-out can be notably increased.

The movement of the tip through the component in order to form the hole can in particular be a translatory movement. For example the tip can be set into a movement which extends exclusively in the direction of the longitudinal axis of the bolt element.

The movement of the tip through the component in order to form the hole can have however also be a rotary movement. The heat of friction which is hereby generated can be exploited for the local heating of the component in the region of the attachment, so that no additional heating power or only little additional heating power is required in order to bring the component locally to a temperature at which the matrix material has a soft or pasty consistency.

Basically it is also possible for the bolt element to be rotated and also pressed from the very start, with the tip thus having a rotational and a translational component of movement and being pressed through the component. This movement can be retained until the contact surface contacts the component.

Furthermore it is basically possible to displace the bolt element only in the direction of its longitudinal axis and to dispense with a rotary movement of the bolt element. Since the soft matrix material is expanded through the movement of the bolt element through the composite material and is pressed inwardly by the outwardly disposed material and/or through the pressing action of a die button that is eventually used, the material and preferably also a part of the reinforcing material that is used can be pressed into the thread of the bolt element. This material is then solid after the cooling down of the material to the environmental temperature and forms a female thread which accommodates the male thread of the bolt element, precisely in the same way as a female thread arises in the embodiment of the rotary movement of the bolt element. This embodiment with only an axial movement of the bolt element is particularly simple to realize. The movement of the tip or of the bolt element can take place in a press, by tongs, by a robot, by means of a C-frame with a power cylinder or a tool such as an arbor press or a pillar drill (drill press) or otherwise.

In accordance with an embodiment of the invention, after the formation of the internal thread in the hole of the component, a force is exerted onto the side of the component remote from the head part and a force is exerted onto the head part in order to press material of the composite material around the hole into any ring groove that is present and into contact with the surfaces of the features providing security against rotation and also optionally to ensure or generate a planar screw-on surface at the side of the component remote from the head part. In this way, an undesired material removal or an undesired material deformation with a rotating contact between any features providing security against rotation and the component surface can be avoided.

Furthermore, the component can be heated in the region of the piercing to a matrix material dependent temperature at which the matrix material of the composite material does not melt but softens or becomes pasty, for example at a temperature of 260° C. when the material is PA6. In this manner the pressing of the tip through the component but also the formation of an internal thread in the wall of the hole on rotation of the thread cylinder is facilitated.

The component can be held during the hole formation by means of the tip either free standing or supported on a support having an opening for receiving the tip. As an alternative or in addition, the bolt element can also be pre-loaded in the direction towards the component during the formation of the internal thread.

As a support a supporting component can be used having a cut-out defining the opening. At the support auxiliary means for the hole formation can also be provided, in particular an iris diaphragm having a small starting opening which can be pressed open to a larger opening. The component of composite material provided for the attachment of the bolt elements is then preferably brought with one side into contact with the iris diaphragm and the tip of the bolt element is pressed through the component coming from the opposite side of the component, with the smaller initial opening of the iris diaphragm accommodating a narrower region of the tip and transforming into a larger opening with increasing penetration of the component by the tip, whereby the component is at least as fully as possible supported over the full area during the hole formation by the support. Thus, the component of a composite material is provided with a hole by means of the tip which is pressed through the component while the component is supported at the underside, and indeed in the area of the piercing always immediately adjacent to the tip, so that as little composite material as possible can escape between the side wall of the tip and the periphery of the hole, because the opening of the iris diaphragm always adapts to the respective diameter or the respective cross-sectional shape of the tip in the region of the widening hole. An iris diaphragm of this kind is described in the German patent application of the present applicants with the official file reference 102012001067.2, now abandoned but published in the form of US20130207298, the content of which is hereby made part of the present application.

The bolt element can also have a cylindrical rivet section which surrounds the shaft part adjacent to the head part, with the ring groove having at the radially inner side not a diameter which is smaller than the outer diameter of the thread cylinder but rather having a boundary at this radially inner side which is aligned with a cylinder section having the same diameter as the outer diameter of the rivet section and which lies between the head part and the rivet section, with the component being supported during the hole formation by means of the tip on a support having an opening for receiving the tip, which preferably has a raised portion surrounding the opening which, on abutment at the rivet section presses a part of the rivet section radially outwardly. In this way, a rivet bead can be formed which engages behind the material of the component and thus increases the resistance against press-out. The raised portion can for this purpose have a conical cross-sectional shape.

The invention relates also to a bolt element, in particular for use in a method as described above and in particular for the attachment to a component of the composite material such as a fiber reinforced plastic part or a fabric reinforced plastic part, with the bolt element having a head part having a contact surface and a shaft part pointing away from the head part, with the shaft part being provided at its end remote from the head part with a tip which merges into a thread cylinder, optionally via a cylindrical region. The cylindrical region can have an axial length which corresponds approximately to the thickness of the component or is longer or shorter than the thickness of the component. The purpose of this cylindrical axially parallel region is to so calibrate the hole of the component that the bolt element is well guided and forms a clean thread in the margin of the hole of the component.

In accordance with the invention the bolt element has an axial ring groove radially within the ring-like contact surface, with the ring groove being arranged concentrically to the shaft part and optionally being equipped with features providing security against rotation, with the radially inner side of the ring groove having a diameter which is smaller than the outer diameter of the thread cylinder, and the thread cylinder has a thread run-out which preferably runs out adjacent to the head part at the level of the contact surface.

The features providing security against rotation can be formed as ribs or grooves which are formed in the radial direction at the base of the ring groove and which are optionally extended further in the radial direction over the ring-like contact surface.

In accordance with an embodiment of the invention the annular contact surface, which is optionally divided into arcuate segments by the feature providing security against rotation, either lies in a plane perpendicular to the central longitudinal axis of the bolt element or at least substantially on a conical surface, the conceptual tip of which lies on the side of the head part remote from the shaft part.

A bolt element can also have a cylindrical rivet section which surrounds the shaft part adjacent to the head part and not have a diameter at the radially inner side which is smaller than the outer diameter of the thread cylinder but rather have a boundary at this radially inner side which is aligned with the outer diameter of the rivet section or with a cylinder section having the same diameter as the outer diameter of the rivet section and which is present between the head part and the rivet section, with the thread cylinder having a thread run-out which preferably runs out adjacent to the rivet section at the level of the free end of the rivet section.

Further developments of the invention are set forth in the dependent claims, the description and also in the accompanying drawing.

BRIEF DESCRIPTION OF THE FIGURES

The invention will now be explained in more detail by way of example with reference to the drawing.

DETAILED DESCRIPTION OF THE INVENTION

Figure 1A:
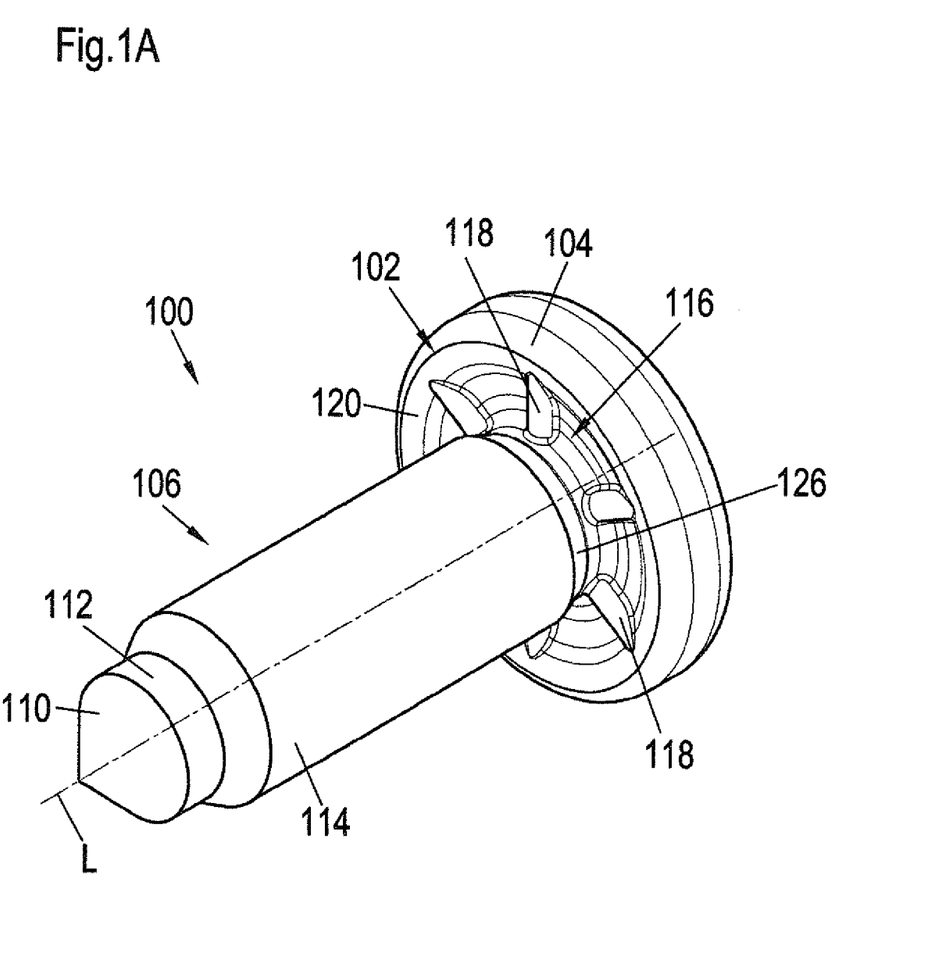
FIG. 1A is a perspective illustration of a bolt element in accordance with a first embodiment of the invention.
Figure 1B:
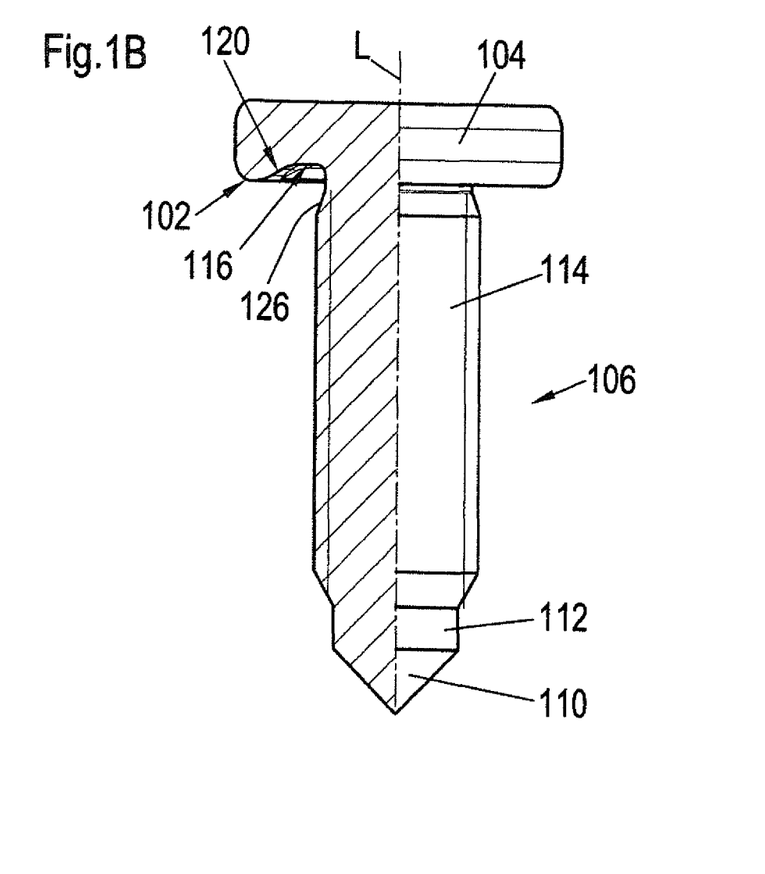
FIG. 1B shows a partly sectioned side view of the bolt element of FIG. 1A.
Figure 1C:
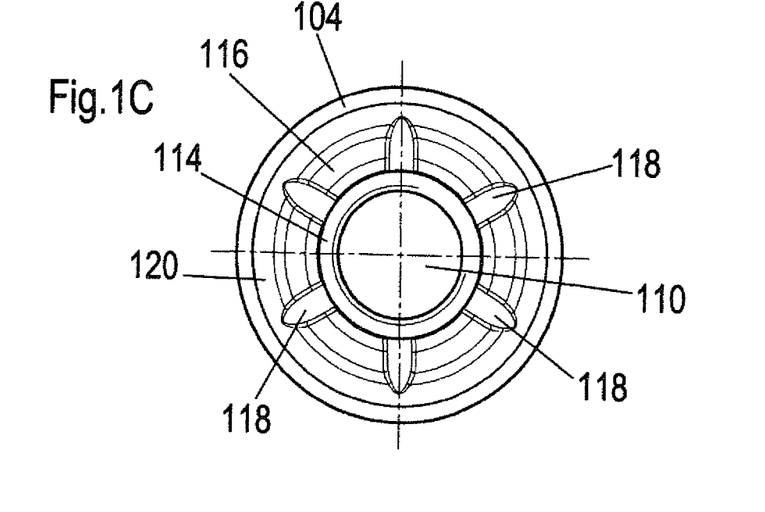
FIG. 1C shows a view of the bolt element of FIG. 1A from below.

The bolt element 100 shown in FIGS. 1A-C has a head part 104 having an annular contact surface 102 and a shaft part 106 extending away from the head part 104. The shaft part 106 is provided at its end remote from the head part 104 with a tip 110 which merges via a cylindrical region 112 into a thread cylinder 114. The tip converges to a point.

An axial ring groove 116 is located radially inside the contact surface 102 with respect to a central longitudinal axis L of the bolt element 100. This ring groove 116 is arranged concentrically to the shaft part 106 and has features 118 providing security against rotation in the form of ribs which are formed in the radial direction at the base of the ring groove 116. The radially inner side of the ring groove 116 has a diameter which is smaller than the outer diameter of the thread cylinder 114. Furthermore, the thread cylinder 114 has thread run-out 120 which runs out adjacent to the head part 104 at the level of the contact surface 102.

The ring-like contact surface 102 lies at least substantially on a conical surface 120 the conceptual apex of which lies at the side of the head part 104 remote from the shaft part 106.

Figure 2A:
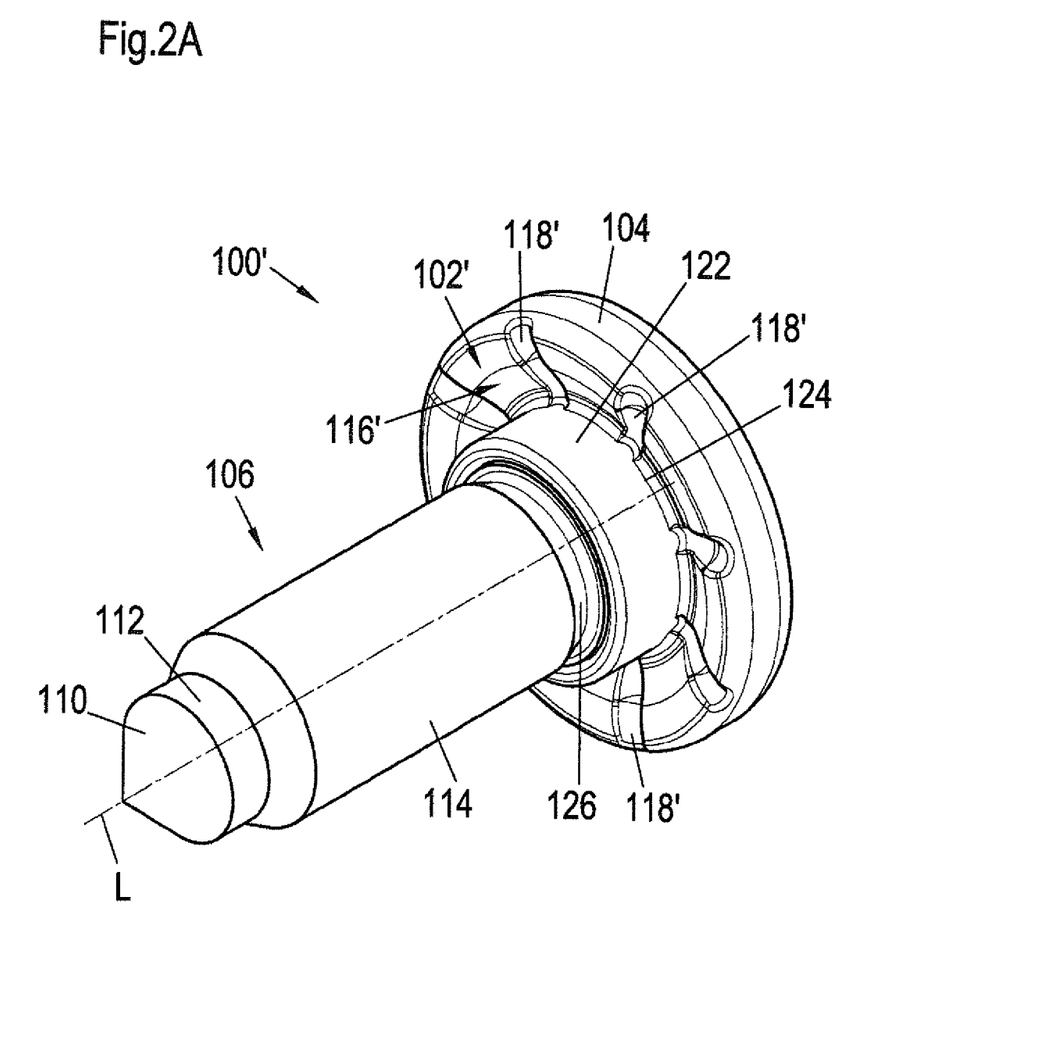
FIG. 2A is a perspective illustration of a bolt element in accordance with a second embodiment of the invention.
Figure 2B:
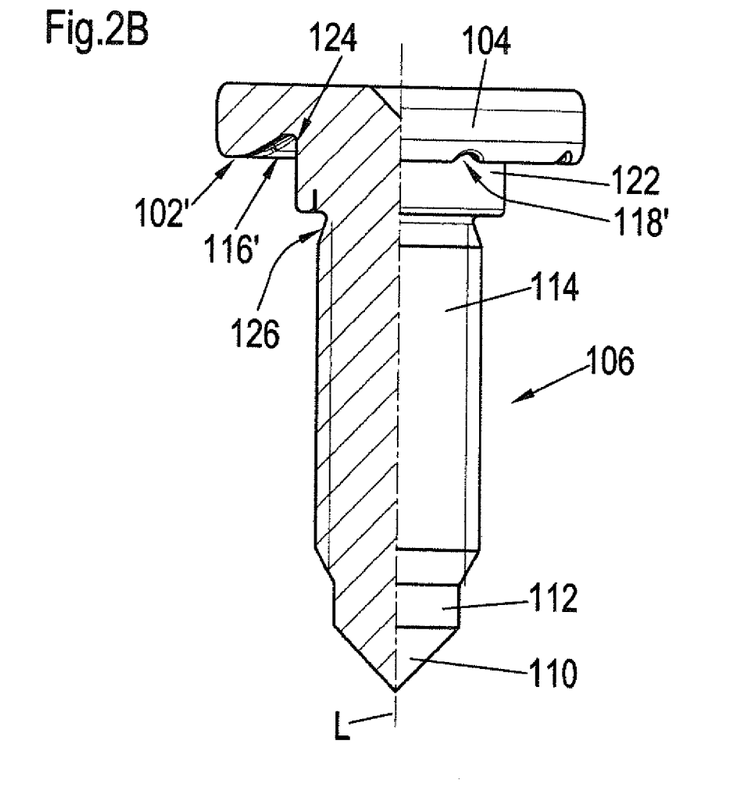
FIG. 2B shows a partly sectioned side view of the bolt element in accordance with FIG. 2A.
Figure 2C:
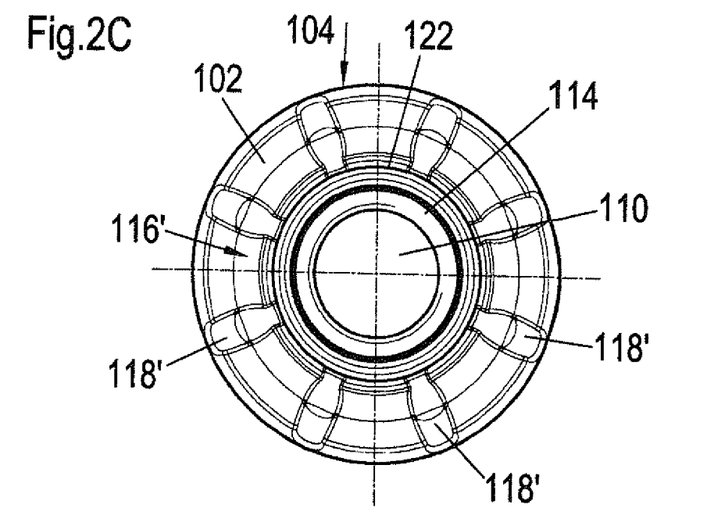
FIG. 2C shows a view of the bolt element in accordance with FIG. 2A from below.

A bolt element 100' in accordance with an alternative embodiment of the invention is shown in FIGS. 2A-C with the same or equivalent components being provided with the same reference numerals as in the bolt element in accordance with FIGS. 1A-C. In distinction to the bolt element 100 in accordance with FIGS. 1A-C the bolt element 100' shown in FIGS. 2A-C has a cylindrical rivet section 122 which surrounds the shaft part 106 adjacent to the head part 104, with the ring groove 116', in contrast to the embodiment of FIGS. 1A-C, not having a diameter at the radially inner side which is smaller than the outer diameter of the thread cylinder 114 but rather having a boundary 124 at this radially inner side which is aligned with the outer diameter of the rivet section 122, or with a cylinder section having the same diameter as the outer diameter of the rivet section 122 and present between the head part 104 and the rivet section 122. Furthermore, the thread cylinder 114 has a thread run-out 126 which runs out adjacent to the rivet section 122 at the level of the free end of the rivet section 122.

In the bolt element 100' in accordance with FIGS. 2A-C grooves are provided instead of ribs as the features 118' providing security against rotation and are extended in the radial direction across the annular contact surface 102' and consequently extend up to the margin of the head part 104. The contact surface 102' is thus split up into arcuate segments by the features 118' providing security against rotation. Moreover, the contact surface 102' does not form a cone but rather extends at least substantially in a plane perpendicular to the central longitudinal axis L of the bolt element 100'.

A method for the attachment of the bolt element 100 of a first embodiment shown in FIGS. 1A-C to a component of a composite material will be described with reference to the FIGS. 3A-D.

Figure 3A:
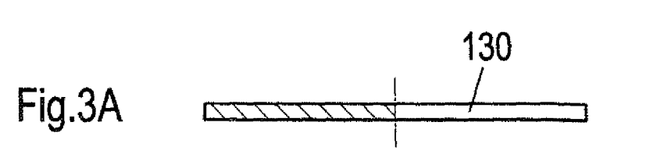
FIGS. 3A-D show various working steps during the attachment of the bolt element in accordance with FIGS. 1A to 1C to a component of a composite material, with FIG. 3A showing the component in a partly sectioned view, FIG. 3B showing the component after it has been pierced by a tip of the bolt element, FIG. 3C showing the bolt element after it has been inserted further into the component so that the component engages the threads of the bolt element and FIG. 3D showing the finished component assembly.
Figure 3B:
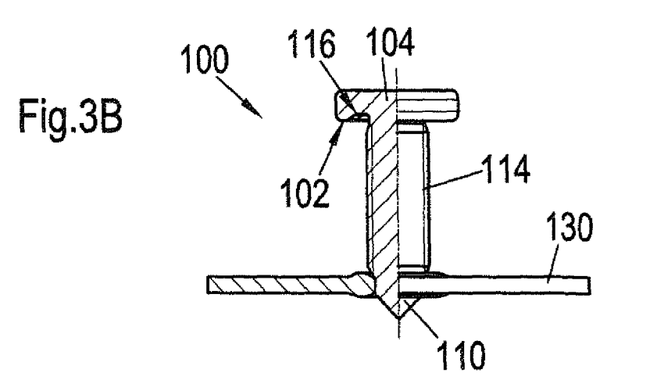
Figure 3C:
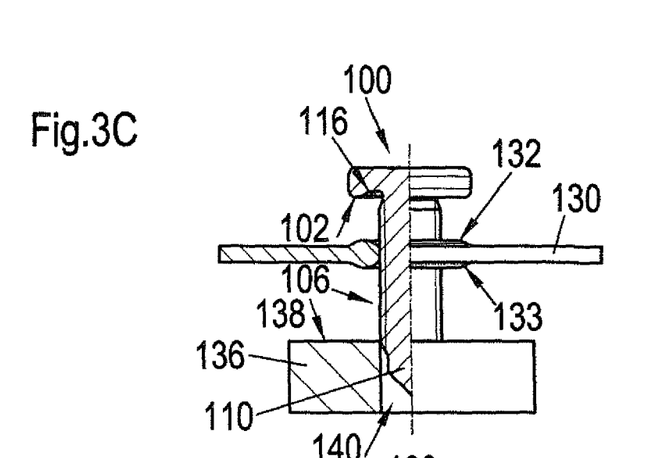
Figure 3D:
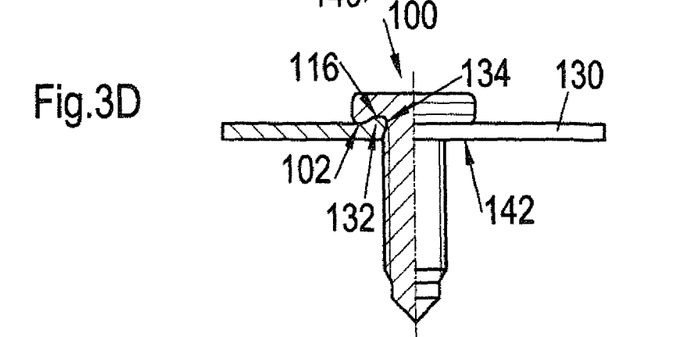
Figure 4A:
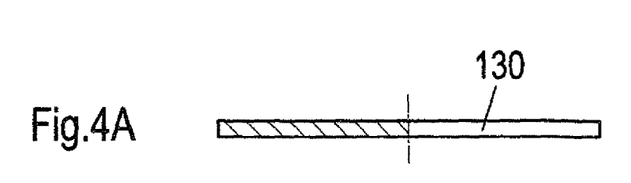
FIGS. 4A-D show various working steps during an alternative method of attachment of the bolt element in accordance with FIGS. 2A and 2B to a component of a composite material, with FIG. 4A showing the component in a partly sectioned view, FIG. 4B showing the component after it has been pierced by a tip of the bolt element, FIG. 4C showing the bolt element after it has been inserted further into the component so that the component engages the threads of the bolt element and FIG. 4D showing the finished component assembly.
Figure 4B:
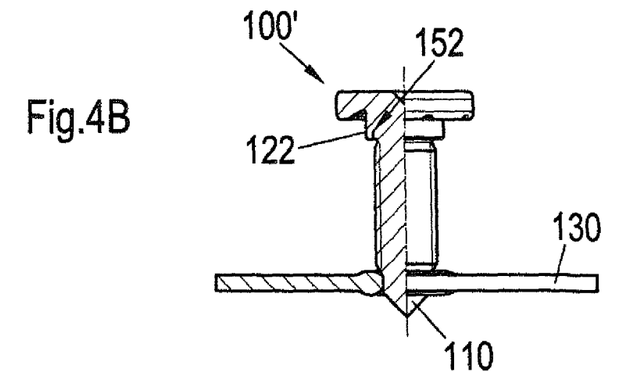
Figure 4C:
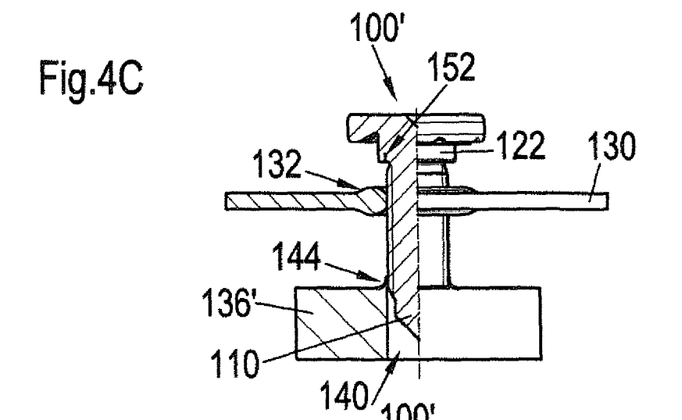
Figure 4D:
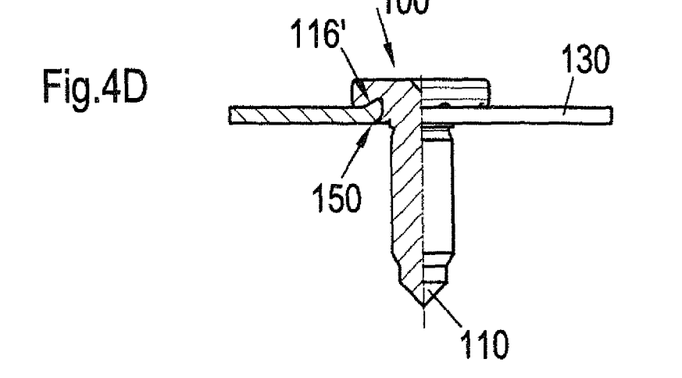

In accordance with FIG. 3A a component 130 of a composite material such as a fiber reinforced plastic part or a fabric reinforced plastic part is of panel-like design, can however also be preshaped and have a three-dimensional shape and is provided for the attachment of a bolt element 100. The bolt element is normally attached in a plane region of the component, this region can however also have a slight curvature or be located directly adjacent a lip or fold. As can be seen from FIG. 3B the bolt element 100 is pressed with the tip 110 to the fore against the component 130 and the tip 110 is pressed through the component 130 until the side of the component 130 adjacent to the head part 104 of the bolt element 100 enters into contact with the thread cylinder 114. The tip 110 thereby generates a hole in the component 130. Thereafter the bolt element 100 is rotated so that the thread and thread cylinder forms an internal thread in the wall of the hole (FIG. 3C). During this, the bolt element 100 can also continue to be pressed in the direction of the component 130 with a slight force, which is not however essential when the bolt element pulls itself into the hole as a result of the rotation. The rotation and optionally the pressing of the bolt element 100 is continued until the contact surface 102 is brought, as shown in FIG. 3D into contact against the upper side of the component 130.

Through the hole formation and the material displacement which is associated therewith raised portions 132, 133 arise in accordance with FIG. 3C at the top side and at the lower side of the component 130. As can be seen from FIG. 3D, the bolt element 100 is rotated until the upper raised portion 132 has entered into engagement with the ring groove 116 and the features 118 (FIG. 1A) providing security against rotation. As the radially inner side of the ring groove 116 has a diameter which is smaller than the outer diameter of the thread cylinder 114 the material of the component 130 is so deformed in the region of the upper raised portion 132 that it builds the ring groove 116 and hereby enters into an undercut formed between the thread cylinder 114 and the head part 104.

After formation of the internal thread in the hole of the component 130 a force can with advantage be exerted at the side of the component 130 remote from the head part 104 of the bolt element and the force can be exerted on the head part 104 in order to press the material of the composite material around the hole into the ring groove 116 and into contact with the surface of the features 118 (FIG. 1a) providing security against rotation. The force can be exerted on the component 130 in that the component 130 is supported on a support 136 (FIG. 3C) in of which the support surface 138 has an opening 140 provided to receive the tip 110 and the also the shaft part 106. This support can be a die button forming an iris diaphragm in accordance with the above-described German patent application, i.e. the German patent application 10 2012 001 067.2.

The planar support surface 138 also serves to generate a planar screw-on surface 142 (FIG. 3D) at the side of the component 130 remote from the head part 104. This axial force is preferably applied as soon as the bolt element has been screwed into a component through a rotary movement such that the material of the component is just beginning to contact the features providing security against rotation or non-rotationally symmetrical features of shape. The rotary movement is then also preferably stopped as a further rotary movement could lead to an undesired scraping action at the features providing security against rotation or at the named non-rotational symmetrical features of shape which would lead to damage to the component above all to the fiber reinforcement. However, it should be noted that, at least with some matrix materials such as thermoplastic matrix materials, or materials which can be subjected to plastic flow before they have reached the finally cured state, the rotation of the bolt element can be continued until the matrix material has fully filled the ring groove and engaged the feature providing security against rotation and pressed flat at its underside. Thus it is not essential to terminate the rotation once the features of shape providing security against rotation have engaged or reached the matrix material.

In order to aid the formation of the hole and the internal thread the component 130 can be heated in the region of the piercing to a matrix material dependent temperature at which the matrix material of the composite material is not melted but rather softens or becomes pasty. When the material is PA6 (polyamide 6) heating to 260° C. can be considered by way of example.

The bolt element 100' in accordance with the second embodiment (FIGS. 2A-C) is applied as shown in FIGS. 4A-D to a component 130 of the composite material. In principle one precedes in the same way as is described above with reference to FIGS. 3A-D.

The component 130 is again supported on a support 136' with the opening 140 during the hole formation by means of the tip 110. However, the support 136' here has a raised portion 144 surrounding the opening 140. When the rivet section 122 abuts against the upper raised portion 132 of the component 130 a part of the rivet section 122 is pressed radially outwardly so that a rivet bead 150 forms which can be seen in FIG. 4D and which increase the resistance to press-out. A parting location 152 in the rivet section 122, in the form of a narrow ring groove, can aid the formation of the rivet bead 150. Preferably, the parting location 152 is arranged such that it meets the raised portion 144 on introduction of the bolt element 100'.

The present invention can be used both with bolt elements which are realized as press-in elements and also bolts which are riveting bolt elements.

REFERENCE NUMERAL LIST 100, 100' bolt element
102, 102' contact surface
104 head part
106 shaft part 110 tip
112 cylindrical region
114 thread cylinder
116, 116' ring groove
118, 118' features providing security against rotation
120 conical surface
122 rivet section
124 boundary
126 thread run-out
130 component of composite material
132 upper raised portion
133 lower raised portion
134 undercut
136 support
138 support surface
140 opening
142 screw-on surface
144 raised portion
146 undercut
150 rivet bead
152 parting position
L longitudinal axis

The invention claimed is:

1. A method for the attachment of a bolt element (100, 100') to a component (130) in the form of a sheet of a composite material having a plastic matrix material and reinforced fibers disposed therein and the composite material having an upper side and a lower side defining a material thickness, wherein the bolt element (100, 100') has a central longitudinal axis extending in directions defining above and below the bolt element, a head part (104) having a contact surface (102, 102') defined below the head part in the direction of the central longitudinal axis and a shaft part (106) extending away from the head part (104) in the direction of the central longitudinal axis, the shaft part (106) having a tip (110) provided at a lower terminal end remote from the head part (104) for piercing the component (130), the tip (110) merging into a thread cylinder (114), the method comprising:

a first step of heating the component (130) in a region to be pierced by the tip (110) of the bolt element (100, 100') to a temperature dependent on the plastic matrix material at which the matrix material of the composite material does not melt but softens or becomes pasty, a second step of generating a hole in the component (130) by pressing the tip (110) of the bolt element (100, 100') against the component (130) in a movement which extends exclusively in the direction of the central longitudinal axis of the bolt element so that the tip (110) is pressed through the component (130) until the upper side of the component adjacent the head part (104) of the bolt element during the pressing, enters into contact with the thread cylinder (114), a third step of turning the bolt element so that the thread of the thread cylinder (114) forms an internal thread in the wall of the hole, and a fourth step of bringing the contact surface (102, 102') into engagement against the said upper side of the component (130).

2. The method in accordance with claim 1, wherein the bolt element (100, 100') has an axial ring groove (116) arranged concentrically to the shaft part (106) and radially within the contact surface (102, 102'), the contact surface being an annular contact surface and which is optionally equipped with features (118, 118') providing security against rotation, wherein the component (130) has a ring-like raised portion (132) at the side confronting the head part (104) and wherein the bolt element (100, 100') is rotated until or displaced until the raised portion (132) enters into engagement with the axial ring groove (116) and optionally with features providing security against rotation (118, 118') which are provided there.

3. The method in accordance with claim 2, wherein the radially inner side of the ring groove (116) has a diameter which is smaller than the outer diameter of the thread cylinder (114) and wherein the material of the component around the hole, particularly in the region of the raised portion (132) is so deformed, that it fills out the ring groove (116), at least substantially or enters into an uncut (134) formed between the thread cylinder (114) and the head part (104).

4. The method in accordance with claim 1, wherein, after the formation of the internal thread in the hole of the component (130) a force is exerted on the side of the component (130) remote from the head part (104) of the bolt element (100, 100') and a force is exerted on the head part (104) in order to bring material of the composite material around the hole into any ring groove (116) that is formed there and into contact with the surfaces of the features (118, 118') providing security against rotation and also, optionally, to ensure or generate a planar screw-on surface (142) at the side of the component (130) remote from the head part (104).

5. The method in accordance with claim 1, wherein the component (130) is either held free standing during the hole formation by means of a tip (110) or is supported on a support (136) having an opening (140) to receive the tip (110) and/or wherein the bolt element (100, 100') is urged towards the component (130) during the formation of the internal thread.

6. The method in accordance with claim 1, wherein the bolt element (100') has a cylindrical rivet section (122) which surrounds the shaft part (106) adjacent to the head part (104), with the ring groove (116') having a diameter at the radially inner side which is not smaller than the outer diameter of the thread cylinder (114), but rather has a boundary (124) at this radially inner side which is aligned with the outer diameter of the rivet section (122) or with a cylindrical section of the same diameter as the outer diameter of the ring section (122), and which is present between the head part (104) and the rivet section (122) with the component being supported on a support having an opening (140) to receive the tip (110) during the hole formation by means of the tip (110), the support (136') having a raised portion (144) which preferably surrounds the opening (140) and which, on being pressed against the rivet section (122) presses a part of the rivet section (122) radially outwardly.

7. A method in accordance with claim 1 wherein the tip (110) merges via a cylindrical region (112) into the thread cylinder (104) defining a second thickness and the cylindrical region (112) is pressed through the hole.

8. A method for the attachment of a bolt element (100, 100') to a component (130) in the form of a sheet of a composite material having a matrix material and reinforcing fibers disposed therein and the composite material having an upper side and a lower side defining a material thickness, wherein the bolt element (100, 100') has a central longitudinal axis extending in directions defining above and below the bolt element, a head part (104) having a contact surface (102, 102') defined below the head part in the direction of the central longitudinal axis and a shaft part (106) extending away from the head part (104) in the direction of the central longitudinal axis, the shaft (106) part having a tip (110) provided at a lower terminal end remote from the head part (104) for piercing the component (130), the tip (110) merging into a thread cylinder (114), the method comprising:

a first step of heating the component (130) in a region of the piercing to be pierced by the tip (110) of the bolt element (100, 100') to a temperature dependent on the plastic matrix material at which the matrix material of the composite material does not melt but softens or becomes pasty, a second step of generating a hole in the component (130) by pressing the tip (110) of the bolt element (100, 100') against the component (130) in a movement which extends exclusively in the direction of the central longitudinal axis of the bolt element so that the tip (110) is pressed through the component (130) until the upper side of the component confronting the head part (104) of the bolt element (100, 100') enters into contact with the contact surface and the tip (110) thereby generates a hole in the component (130), and a third step of pressing the material of the component located directly around the thread cylinder (114) of the bolt element inwardly into the thread of the thread cylinder (114) by at least one of the following steps:

expanding the matrix material through the movement of the bolt element through the composite material and pressing the matrix material inwardly by the outwardly disposed material, and by the pressing action of a die button, thereby forming an internal thread in the wall of the hole which engages the thread of the thread cylinder (114).

9. The method in accordance with claim 8, wherein the bolt element (100, 100') has an axial ring groove (116) radially within the ring-like contact surface (102, 102') which is arranged concentrically to the shaft part (106) and which is optionally equipped with features (118, 118') providing security against rotation, wherein the component (130) has a ring-like raised portion (132) at the side confronting the head part (104) and wherein the bolt element (100, 100') is rotated until or displaced until the raised portion (132) enters into engagement with the axial ring groove (116) and optionally with features providing security against rotation (118, 118') which are provided there.

10. The method in accordance with claim 9, wherein the radially inner side of the ring groove (116) has a diameter which is smaller than the outer diameter of the thread cylinder (114) and wherein the material of the component around the hole, particularly in the region of the raised portion (132) is so deformed, that it fills out the ring groove (116), at least substantially or enters into an uncut (134) formed between the thread cylinder (114) and the head part (104).

11. A method in accordance with claim 8, wherein, after the formation of the internal thread in the hole of the component (130) a force is exerted on the side of the component (130) remote from the head part (104) of the bolt element (100, 100') and a force is exerted on the head part (104) in order to bring material of the composite material around the hole into any ring groove (116) that is formed there and into contact with the surfaces of the features (118, 118') providing security against rotation and also, optionally, to ensure or generate a planar screw-on surface (142) at the side of the component (130) remote from the head part (104).

12. The method in accordance with claim 8, wherein the component (130) is either held free standing during the hole formation by means of a tip (110) or is supported on a support (136) having an opening (140) to receive the tip (110) and/or wherein the bolt element (100, 100') is urged towards the component (130) during the formation of the internal thread.

13. The method in accordance with claim 8, wherein the bolt element (100') has a cylindrical rivet section (122) which surrounds the shaft part (106) adjacent to the head part (104), with the ring groove (116') having a diameter at the radially inner side which is not smaller than the outer diameter of the thread cylinder (114), but rather has a boundary (124) at this radially inner side which is aligned with the outer diameter of the rivet section (122) or with a cylindrical section of the same diameter as the outer diameter of the ring section (122), and which is present between the head part (104) and the rivet section (122) with the component being supported on a support having an opening (140) to receive the tip (110) during the hole formation by means of the tip (110), the support (136') having a raised portion (144) which surrounds the opening (140) and which, on being pressed against the rivet section (122) presses a part of the rivet section (122) radially outwardly.

14. A method in accordance with claim 8 wherein the tip (110) merges via a cylindrical region (112) defining a second thickness into the thread cylinder (104) and the cylindrical region (112) is pressed through the hole.

\* \* \* \* \*